(12) United States Patent
Takahashi

(10) Patent No.: US 11,562,481 B2
(45) Date of Patent: Jan. 24, 2023

(54) IMAGE PROCESSING APPARATUS, CONTROL METHOD THEREOF, AND STORAGE MEDIUM

(71) Applicant: CANON KABUSHIKI KAISHA, Tokyo (JP)

(72) Inventor: Kosei Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/412,941

(22) Filed: Aug. 26, 2021

(65) Prior Publication Data

US 2022/0067901 A1 Mar. 3, 2022

(30) Foreign Application Priority Data

Sep. 1, 2020 (JP) .............................. JP2020-147086

(51) Int. Cl.
  *G06T 7/00* (2017.01)
  *G06K 15/02* (2006.01)
  *G06K 15/00* (2006.01)
  *H04N 1/00* (2006.01)

(52) U.S. Cl.
  CPC ............ *G06T 7/001* (2013.01); *G06K 15/027* (2013.01); *G06K 15/408* (2013.01); *G06T 2200/24* (2013.01); *G06T 2207/10008* (2013.01); *G06T 2207/20092* (2013.01); *G06T 2207/30144* (2013.01); *H04N 1/00798* (2013.01)

(58) Field of Classification Search
  CPC ................. G06T 7/001; G06T 2200/24; G06T 2207/10008; G06T 2207/20092; G06T 2207/30144; G06K 15/027; G06K 15/408; H04N 1/00798
  See application file for complete search history.

(56) References Cited

U.S. PATENT DOCUMENTS

| | | | |
|---|---|---|---|
| 7,792,352 B2* | 9/2010 | Sakai | ...................... G06T 7/001 382/218 |
| 2008/0226156 A1* | 9/2008 | Ota | ......................... G06T 7/001 382/141 |
| 2014/0079292 A1 | 3/2014 | Kaneko et al. | |

FOREIGN PATENT DOCUMENTS

JP  6241121 B  12/2017

* cited by examiner

*Primary Examiner* — Quang N Vo
(74) *Attorney, Agent, or Firm* — Canon U.S.A., Inc. IP Division

(57) ABSTRACT

Some embodiments are directed to an image processing apparatus comprising obtaining a reference image and a verification target image; selecting one or more defect detection processing from a plurality of types of defect detection processing for performing defect detection in the verification target image; executing the selected one or more defect detection processing on a difference image between the reference image and the verification target image in accordance with processing parameters of the selected one or more defect detection processing; and outputting a result display screen in which a defect in the verification target image and a defect detection processing used for detecting the defect can be identified, in a case where the defect is detected.

13 Claims, 9 Drawing Sheets

IMAGE PROCESSING APPARATUS, CONTROL METHOD THEREOF, AND STORAGE MEDIUM

BACKGROUND

Field of the Disclosure

The present disclosure relates to an image processing apparatus for testing whether or not a defect has occurred in a printed image, such as a printed article output by a print apparatus, a control method thereof, and a storage medium.

Description of the Related Art

In a printed article output by a print apparatus, stain of, for example, a color material such as ink or toner being attached at an unintended site may occur. Alternatively, there may be cases where, as a result of a color material being attached, a sufficient color material does not attach at a site where an image is to be formed, and color loss, which is color being lightened more than it actually is, occurs. So-called print defects such as the above stain and color loss decrease the quality of the printed article. In view of this, a test may be performed as to whether or not there is a defect in a printed article to guarantee the quality of the printed article.

A visual test, in which a test staff visually tests whether or not there is a defect, requires a lot of time and cost, and thus, in recent years, test systems for automatically performing a test without visual contact have been proposed. There are methods according to which a level of a defect that can be detected (for example, a threshold value for the size of a defect that is detected) can be adjusted in a system for automatically performing a test. In this case, test results vary significantly depending on the adjustment value of the test level, and thus, in order to obtain a desired test result, it is necessary to appropriately adjust the test level. Japanese Patent No. 6241121, for example, proposes a method for outputting an image to which a defect created in a pseudo manner is added, confirming a test result, and adjusting a detection level.

However, the aforementioned conventional technology has an issue to be described below. According to the conventional technology, for example, it is possible to confirm what defect is to be actually detected, and to determine a detection parameter. However, if there are a plurality of types of detection parameters that need to be individually adjusted, it is not possible to determine which parameter to be adjusted only by confirming a detected defect. Therefore, there is a risk that, in order to obtain a desired detection result, trial and error of parameter adjustment is repeated in vain, resulting in a substantial cost.

SUMMARY

Embodiments in the present disclosure enable realization of a mechanism for performing output such that a type of detection processing used for each image defect included in a detection result can be confirmed, when image defect detection is performed using a plurality of types of detection processing.

One aspect of some embodiments provides an image processing apparatus comprising: at least one memory device that stores a set of instructions; and at least one processor that executes the set of instructions to: obtain a reference image and a verification target image; select one or more defect detection processing from a plurality of types of defect detection processing for performing defect detection in the verification target image; execute the selected one or more defect detection processing on a difference image between the reference image and the verification target image in accordance with processing parameters of the selected one or more defect detection processing; and output a result display screen in which a defect in the verification target image and a defect detection processing used for detecting the defect can be identified, in a case where the defect is detected.

Another aspect of some embodiments provides a control method of an image processing apparatus, comprising: obtaining a reference image and a verification target image; selecting a plurality of types of defect detection processing from a plurality of types of defect detection processing for performing defect detection in the verification target image; executing the selected types of defect detection processing on a difference image between the reference image and the verification target image in accordance with processing parameters of the selected types of defect detection processing; and outputting a result display screen in which a defect in the verification target image and a defect detection processing used for detecting the defect can be identified, in a case where the defect is detected.

Still another aspect of some embodiments provides a non-transitory computer-readable storage medium storing a computer program for causing a computer to execute operations of a control method of an image processing apparatus, the control method comprising: obtaining a reference image and a verification target image; selecting a plurality of types of defect detection processing from a plurality of types of defect detection processing for performing defect detection in the verification target image; executing the selected types of defect detection processing on a difference image between the reference image and the verification target image in accordance with processing parameters of the selected types of defect detection processing; and outputting a result display screen in which a defect in the verification target image and a defect detection processing used for detecting the defect can be identified, in a case where the defect is detected.

Further features of various embodiments will be apparent from the following description of exemplary embodiments (with reference to the attached drawings).

DESCRIPTION OF THE EMBODIMENTS

Figure 1:
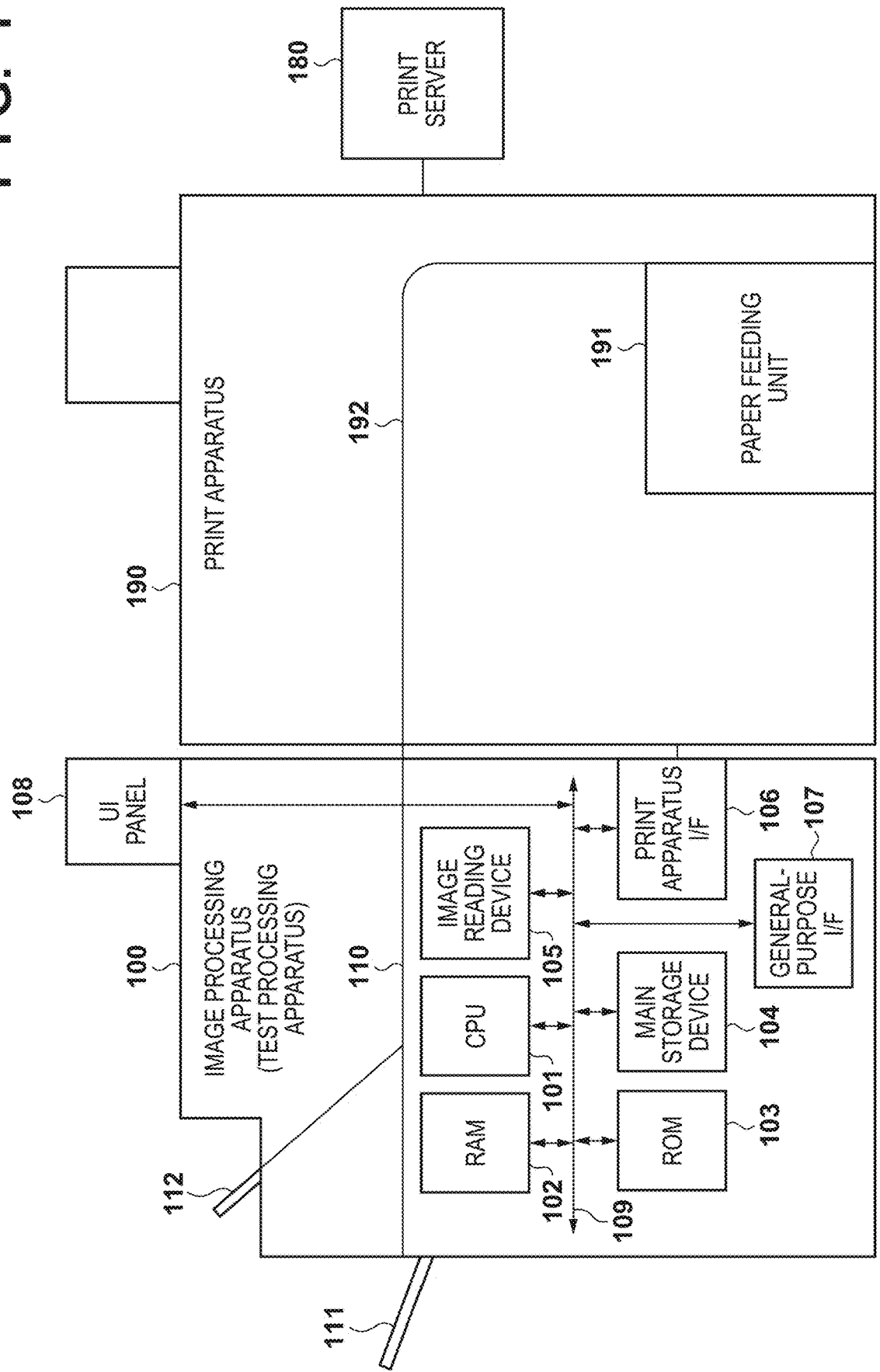
FIG. 1 is a configuration diagram of an entire print system that includes an image processing apparatus according to an embodiment.

Hereinafter, embodiments will be described in detail with reference to the attached drawings. Note, the following embodiments are not intended to limit the scope of the claims or the scope of every embodiment. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

First Embodiment

Configuration of Print System

A first embodiment will be described below. In this embodiment, an example will be described in which, in an image processing apparatus for performing print defect detection using a plurality of detection processing methods, display for easily adjusting parameters of the methods is performed. First, a configuration example of an entire print system that includes an image processing apparatus (inspection processing apparatus) 100 according to this embodiment, and that outputs and tests a printed article, will be described with reference to FIG. 1.

The print system according to this embodiment includes at least the image processing apparatus 100, a print server 180, and a print apparatus 190. The print server 180 has a function of generating a print job of an original document to be printed and submitting the print job to the print apparatus 190. A configuration may be adopted in which a plurality of external apparatuses (not illustrated) are communicably connected to the print server 180 via a network, and a request for generating a print job, print data, and the like are received from these external apparatuses.

The print apparatus 190 has a function of forming an image on a recording medium (print paper) based on a print job submitted from the print server 180. The print apparatus 190 is applicable to an apparatus that adopts an offset printing technique, an electrophotographic method, or an ink-jet technique. In this embodiment, a description will be given assuming a print apparatus that adopts an electrophotographic method, but there is no intention of limiting every embodiment thereto. The print apparatus 190 includes a paper feeding unit 191, and the user sets print paper in the paper feeding unit 191 in advance. When a print job is submitted, the print apparatus 190 forms an image on the front side or both sides of the print paper set in the paper feeding unit 191 while conveying the print paper along a conveyance path 192, and conveys the print paper to the image processing apparatus 100.

The image processing apparatus 100 executes test processing for examining whether or not there is an image defect in a recording medium (e.g., paper, a sheet, or the like) on which the print apparatus 190 formed an image, and that has been conveyed through the conveyance path 192, namely a printed article. Accordingly, the image processing apparatus 100 functions as a test processing apparatus. Note that, here, overall processing for testing whether or not there is an image defect is referred to as "test processing", and processing for detecting each type of a plurality of image defects is included in the test processing, and is referred to as "defect detection processing" (or simply referred to as "detection processing"). The image processing apparatus 100 has a CPU 101, a RAM 102, a ROM 103, a main storage device 104, and an image reading device 105 provided therein. In addition, the image processing apparatus 100 includes an interface (I/F) 106 to a print apparatus, a general-purpose interface (I/F) 107, a user interface (UI) panel 108, and a main bus 109. Furthermore, the image processing apparatus 100 includes a conveyance path 110 for a printed article connected to the conveyance path 192 of the print apparatus 190, an output tray 111 for print products (printed articles) that have passed a test and an output tray 112 for printed articles that have failed the test due to a defect having been found. Note that classification of printed articles is not limited to two categories, namely "image test passed" and "image test failed", and may be broken down further.

The CPU 101 is a processor that performs overall control of the image processing apparatus 100. The RAM 102 functions as a main memory, a work area, and the like of the CPU 101. The ROM 103 stores a group of programs that are executed by the CPU 101. The main storage device 104 stores an application that is executed by the CPU 101, data that is used for image processing, and the like. An image reading device (scanner) 105 reads, on the conveyance path 110, one side or both sides of a printed article sent from the print apparatus 190, and obtains the printed article as image data. Specifically, the image reading device 105 reads one side or both sides of a printed article that is conveyed, using one or more reading sensors provided in the vicinity of the conveyance path 110. A reading sensor may be provided only for one side, or reading sensors may also be provided for both sides, namely the front side and the back side of a printed article that is conveyed such that the two sides thereof are read at the same time. A configuration may also be adopted in which, if a reading sensor is provided only for one side, the one side of a printed article is read and the front and back of the printed article that is being conveyed using a two-side conveyance path (not illustrated) are then reversed on the conveyance path 110, and the reading sensor reads the printed article again on the other side.

The print apparatus I/F 106 is connected to the print apparatus 190, and can synchronize processing timings of a printed article with the print apparatus 190, and transmit/receive an operational status to/from the print apparatus 190. The general-purpose I/F 107 is a serial bus interface of USB or IEEE 1394, and enables the user to take data, such as a log, and import some type of data into the image processing apparatus 100. The UI panel 108 is, for example, a liquid crystal display (display unit) panel, functions as a user interface of the image processing apparatus 100, and displays the current situation and settings to the user. In addition, the UI panel 108 is a touch-panel liquid crystal display, and can accept an instruction from the user as a result of the user operating a displayed button.

The main bus 109 connects the units of the image processing apparatus 100 to each other. Internal portions of the image processing apparatus 100 and the print system can be operated in accordance with an instruction transmitted from the CPU 101 through the main bus 109. It is possible to move the conveyance path 110 in synchronization, for example, and make a switch whether to send a printed article to either the output tray 111 for "passed" or the output tray 112 for "failed" in accordance with a test result. In addition, a GPU may also be included in addition to the CPU.

The image processing apparatus 100 according to this embodiment conveys a printed article conveyed from the print apparatus 190, using the conveyance path 110, while executing test processing to be described later based on image data of the printed article read by the image reading device 105. If the printed article passes a test as a result of the test processing, the printed article is conveyed to the output tray 111 for "passed", otherwise the printed article is conveyed to the output tray 112 for "failed". In this manner, only printed articles whose quality has been confirmed can be collected in the output tray 111 as products to be shipped.

Function Configuration of Image Processing Apparatus

Figure 2:
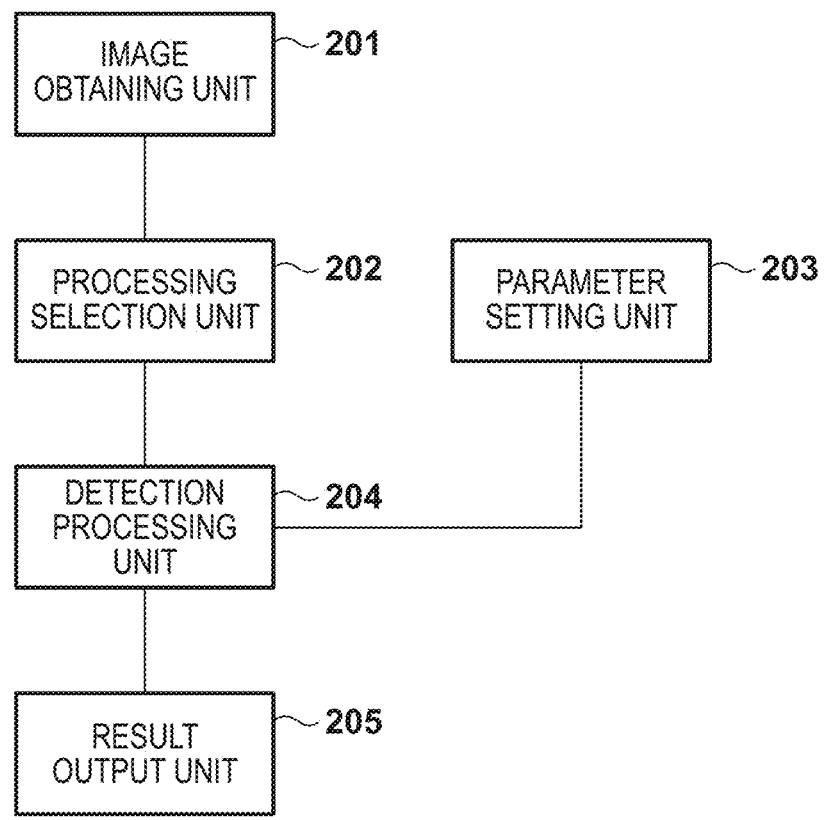
FIG. 2 is a block diagram showing a function configuration of an image processing apparatus according to an embodiment.

Next, an example of configurations of functional blocks mainly related to test processing from among the functional blocks of the image processing apparatus 100 according to this embodiment will be described with reference to FIG. 2. The image processing apparatus 100 includes an image obtaining unit 201, a processing selection unit 202, a parameter setting unit 203, a detection processing unit 204, and a result output unit 205 in order to realize test processing.

The image obtaining unit 201 obtains a reference image data stored in the RAM 102 or the main storage device 104 and a verification target image. Here, the reference image data is image data representing a correct image for comparison with the verification target image, and is, for example, data obtained by the image reading device 105 reading a printed article confirmed to have been normally printed by the print apparatus 190 (or another print apparatus). The reference image data is stored in the RAM 102 or the main storage device 104 of the image processing apparatus 100 in advance. Note that not every embodiment is limited thereto, and, for example, a configuration may also be adopted in which the reference image data held in the print server 180 or the print apparatus 190 is obtained by the image obtaining unit 201. Thus, when the reference image data held in an external apparatus is obtained, the image obtaining unit 201 may transmit an obtaining request to the apparatus, and obtain the reference image data in response to the request.

The processing selection unit 202 selects one or more types of processing from a plurality of types of defect detection processing. The parameter setting unit 203 sets processing parameters of the selected types of defect detection processing based on an operation performed by the user and obtained via the UI panel 108, or the like. The detection processing unit 204 executes the types of defect detection processing selected by the processing selection unit 202, using the parameters set by the parameter setting unit 203. The result output unit 205 outputs a test result of the processing performed by the detection processing unit 204, and outputs the result to the UI panel 108. The result output unit 205 may output the test result to an external apparatus in place of or in addition to the UI panel 108, the external apparatus being connected to the image processing apparatus 100 so as to allow communication via a network.

Test Processing

Figure 3:
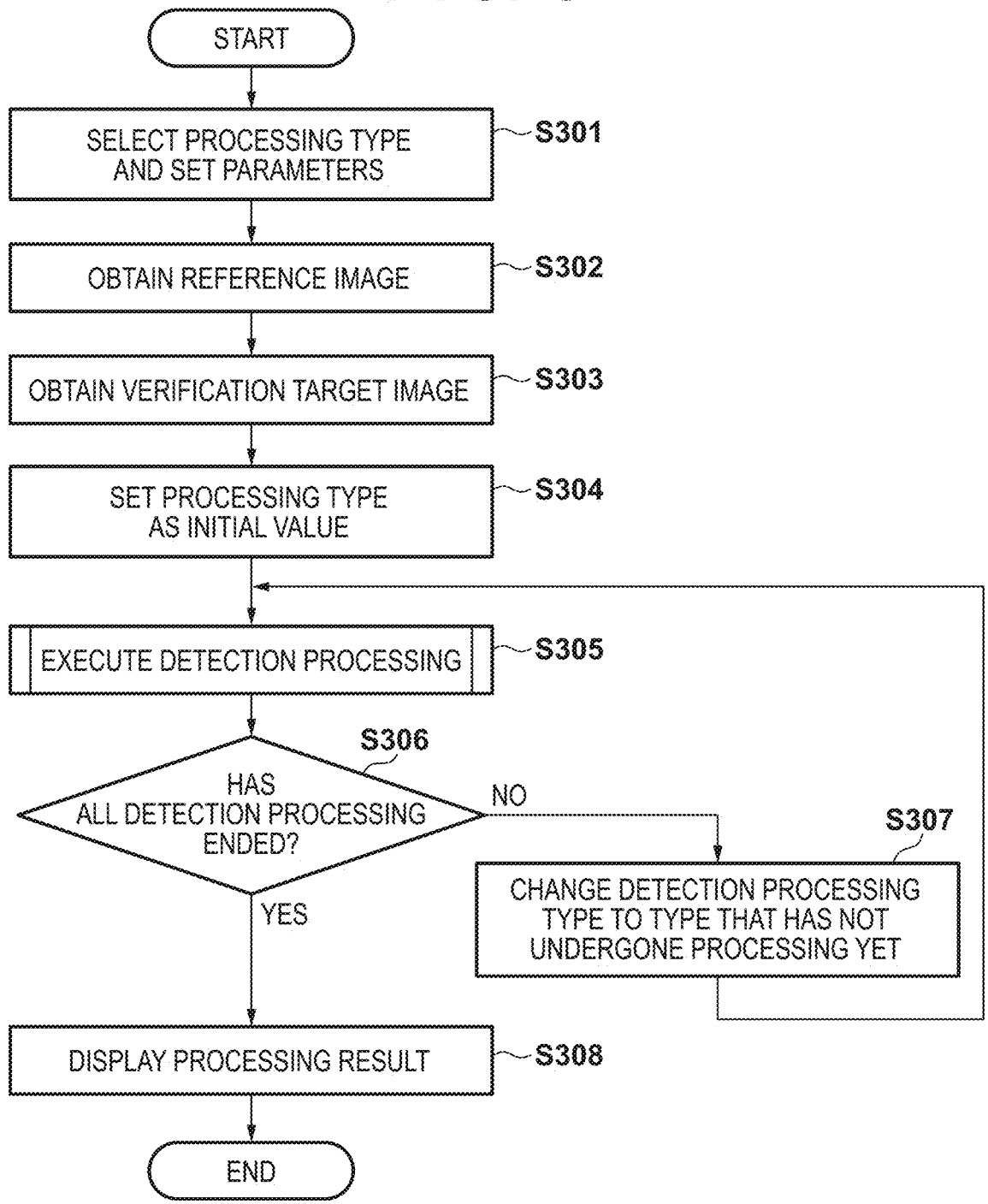
FIG. 3 is a flowchart showing a processing procedure of test processing that is performed by an image processing apparatus according to an embodiment.

Next, a processing procedure of test processing that is performed by the image processing apparatus 100 according to this embodiment will be described with reference to FIG. 3. Processing to be described below is realized by the CPU 101 reading out a program stored in the ROM 103 to the RAM 102 and executing the program, for example.

In S301, the processing selection unit 202 and the parameter setting unit 203 select a plurality of types of defect detection processing to be carried out, based on a user input and the like, and set parameters of the plurality of selected types of defect detection processing. As a matter of course, only one type of defect detection processing can be selected. Processing parameter setting that is performed by the parameter setting unit 203 will be described later in detail. Note that the processing selection unit 202 accepts selection of a plurality of types of defect detection processing made by the user via a selection screen (not illustrated) displayed on the UI panel 108. On the selection screen, for example, types of defects can be selected, and types of defect detection processing for detecting the selected types of defects are selected. Types of defects may include any type of defect, such as color unevenness and a two-dimensional result, in addition to a point-like defect and a linear (streak) defect, which will be described in this embodiment. When selection is not made by the user, types of defect detection processing stipulated by default may be selected. In addition, if the user does not perform input instruction regarding parameter settings, a default setting value may be used.

Next, in S302, the image obtaining unit 201 obtains a reference image (reference image data) from the RAM 102 or the main storage device 104. Furthermore, in S303, the image obtaining unit 201 obtains a verification target image by causing the image reading device 105 to read a printed article conveyed from the print apparatus 190. Note that a configuration may also be adopted in which a verification target image is read by the image reading device 105 in advance, and the read data held in the main storage device 104 is obtained.

Next, in S304, the processing selection unit 202 sets, as an initial value, a type of defect detection processing to be executed, from among the plurality of types of defect detection processing stored in the RAM 102. The initial value indicates a type of defect detection processing to be carried out first, and particularly if no order is set for carrying out the types of defect detection processing, the types of detection processing may be performed in any order, such as an order they were selected. Next, in S305, the detection processing unit 204 executes the defect detection processing. A detailed description thereof will be given later with reference to FIG. 4. Subsequently, in S306, the detection processing unit 204 determines whether or not all the selected types of defect detection processing have ended, and if all the selected types of defect detection processing have ended, the procedure advances to S308, and if there remains a type of defect detection processing that has not ended, the procedure advances to S307.

In S307, the processing selection unit 202 changes the test processing type to a type that has not undergone processing yet, and returns the procedure to S305. Subsequently, the processes in S305 to S307 are repeated until all of the types of defect detection processing end. On the other hand, when all of the types of defect detection processing end, in S308, the result output unit 205 generates a test result, displays the result on the UI panel 108, and ends the procedure. Display processing will be described later in detail.

Defect Detection Processing

Figure 4:
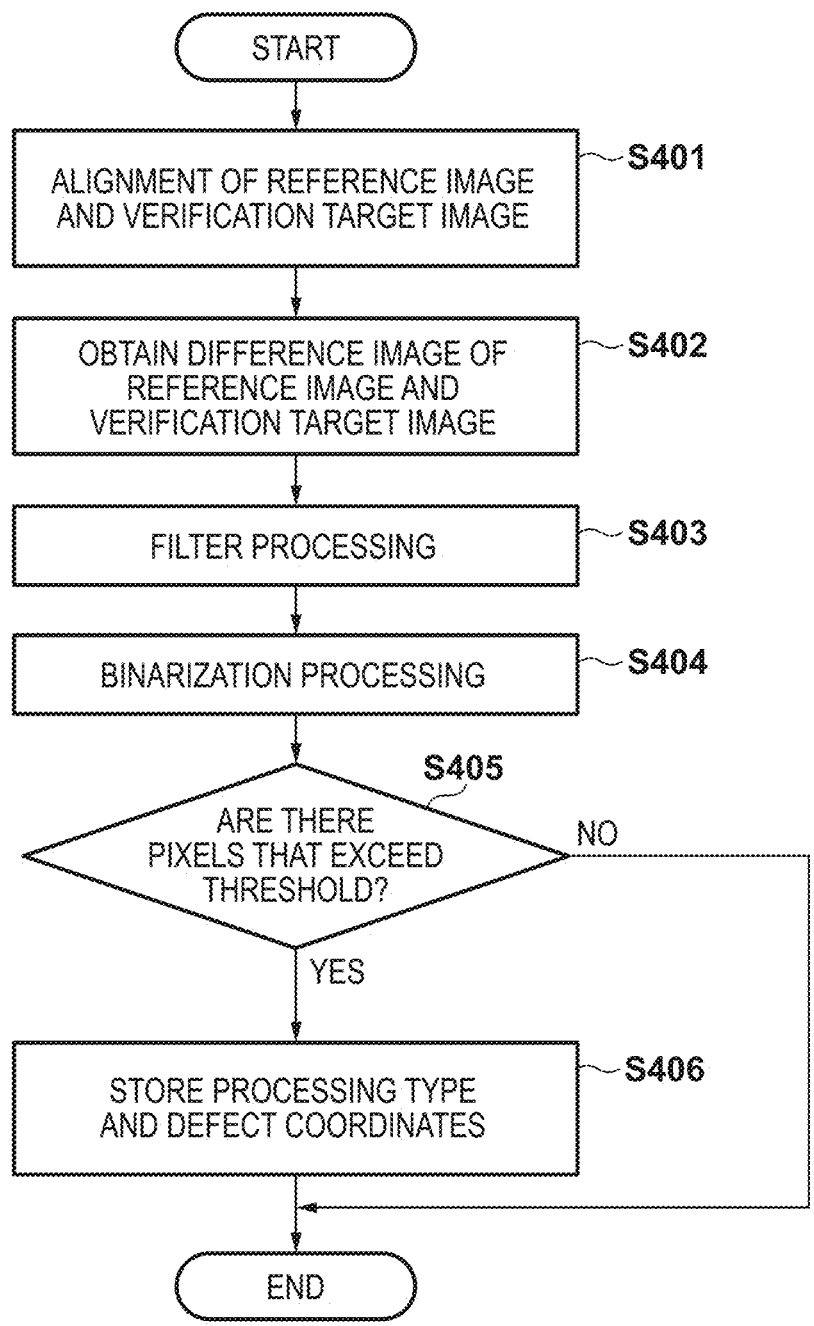
FIG. 4 is a flowchart showing a processing procedure of defect detection processing that is performed by an image processing apparatus according to an embodiment.

Next, a processing procedure of defect detection processing that is executed by the detection processing unit 204 according to this embodiment in S305 will be described with reference to FIG. 4. In this embodiment, a method for detecting a defect in a verification target image through comparison with a reference image confirmed in advance to include no defect will be described as a test processing method. Processing to be described below is realized, for example, by the CPU 101 reading a program stored in the ROM 103 to the RAM 102, and executing the program.

First, in S401, the detection processing unit 204 aligns a verification target image to a reference image using a general alignment processing method. Next, in S402, the detection processing unit 204 obtains a difference image between the reference image and the verification target image, and advances the procedure to S403. Here, the difference image is generated, for example, by comparing the reference image and the verification target image for each pixel, and obtaining a difference value of a pixel value (for example, a density value for each of RGB colors) of the pixel.

In S403, the detection processing unit 204 executes filter processing for emphasizing a specific shape in the difference image obtained in S402. As an example, reference numeral 500 in FIG. 5 indicates a filter for emphasizing a point-like defect, and reference numeral 510 indicates a filter for emphasizing a linear defect. These filters are changed according to a type of defect detection processing selected in S304. For example, when detection of a point-like defect is selected as defect detection processing, processing is executed using the filter 500 in FIG. 5. In addition, when detection of a linear defect is selected as defect detection processing, processing is executed using the filter 510 in FIG. 5.

Next, in S404, the detection processing unit 204 executes binarization processing on the difference image that has undergone emphasizing processing, such that "1" is set if the difference value is larger than or equal to a threshold value and "0" is set if the difference value is smaller than or equal to the threshold value. Next, in S405, in the image that has undergone binarization processing, the detection processing unit 204 determines whether or not there is a pixel in which "1" is set due to the difference value exceeding the threshold value, and if there is any, the detection processing unit 204 advances the procedure to S406, and if there is no such pixel, the detection processing unit 204 determines that there is no defect site, and ends this procedure. In S406, the detection processing unit 204 determines that that is a defect site, stores the type of defect detection processing used for detecting the defect site and the coordinates of the defect site in association with each other, and ends the procedure. The processing described with reference to the flowchart in FIG. 4 is a subroutine of S305, and the flowchart shows a flow of one type of defect detection processing. Therefore, every time the subroutine of S305 is called, a selected type of defect detection processing is executed, and filter processing corresponding to the selected type is executed (S403).

In this embodiment, processing for detecting a point-like defect and processing for detecting a linear defect have been described as an example of defect detection processing, but there is no limitation thereto. That is to say, any processing according to which the user can detect a desired defect is applicable to various embodiments, and there is no limitation to the types of processing.

Processing Parameters

Figure 5:
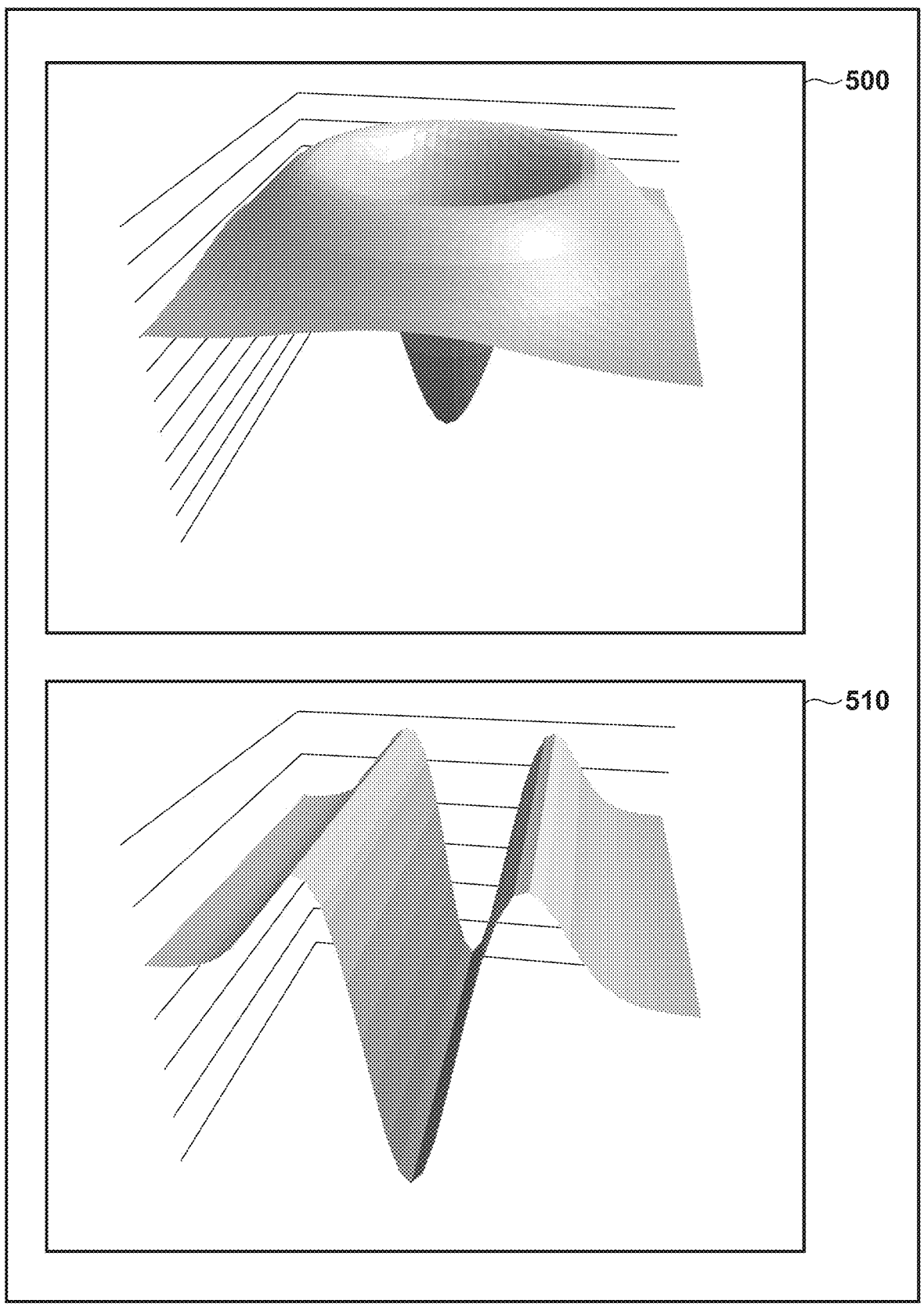
FIG. 5 is a diagram showing an example of the shape of an emphasizing processing filter according to an embodiment.

Here, processing parameters (detection parameters) set by the parameter setting unit 203 in S301 will be described. As described above, in this embodiment, filter processing (S403) and binarization processing (S404) are executed on the obtained difference image. At this time, if the shape of the filter 500 in FIG. 5 is made small, a smaller point-like defect is emphasized, and is easily detected. In addition, if the threshold value for binarization processing is made smaller, a smaller difference exceeds the threshold value in binarization processing and "1" is set, which is detected as a defect. That is to say, it is possible to detect even a defect that has a lower contrast. Thus a parameter related to the size of a filter, a threshold value when detection is performed, and the like are set as processing parameters in S301.

Detection Result Display Method

Figure 6:
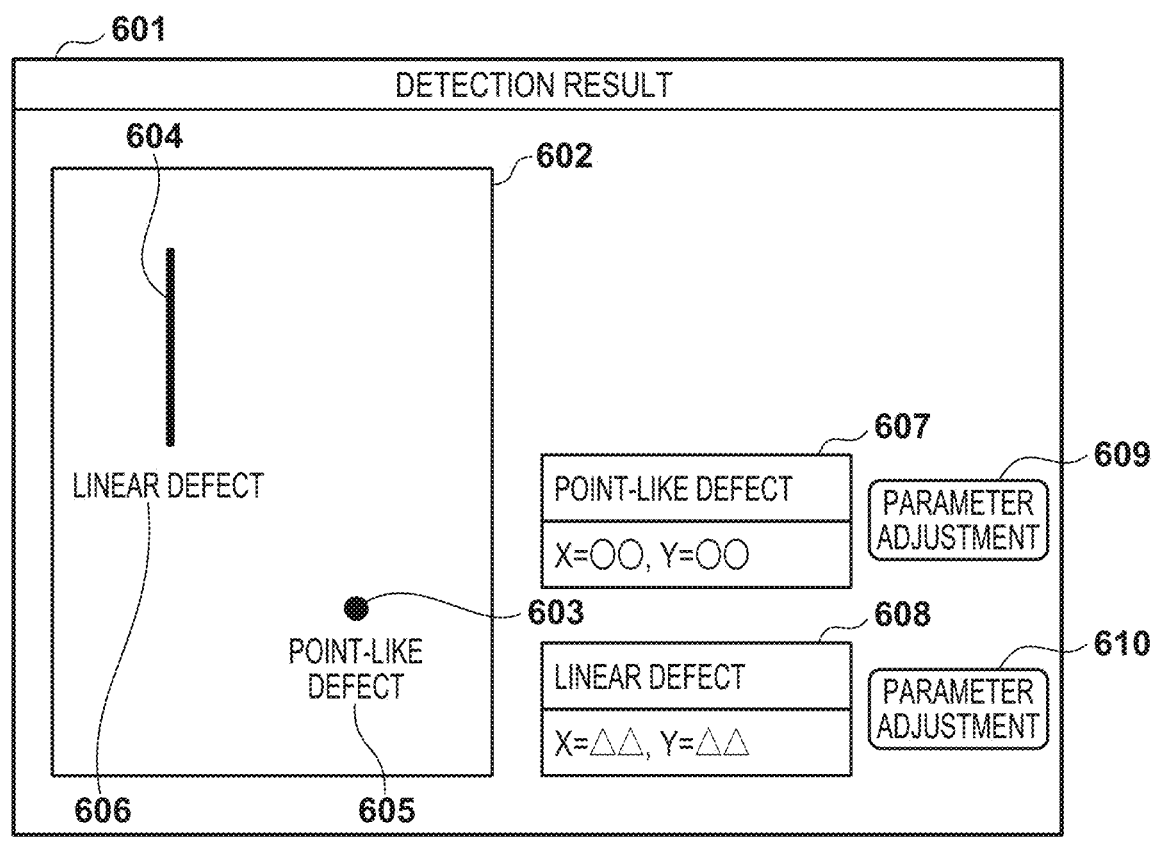
FIG. 6 is a diagram showing an example of a result display screen according to an embodiment.

Next, a display example of a detection result that is displayed by the result output unit 205 according to this embodiment in S308 will be described in detail with reference to FIG. 6. A whole image 602 of a verification target image is displayed on a UI screen 601 shown in FIG. 6. In this embodiment, an example will be described in which the UI screen 601 is displayed on the UI panel 108 of the image processing apparatus 100. However, there is no intention of limiting every embodiment, and the UI screen 601 may also be displayed on a display of an external apparatus, such as a PC communicably connected to the image processing apparatus 100 via a network, in accordance with screen information from the image processing apparatus 100. In addition, here, display output will be described, but a detection result similar to that in a display screen to be described later may be output as a printed article. In this case, the image processing apparatus 100 may transmit print data that includes the detection result to the print server 180 or directly transmits print data to the print apparatus 190, and perform print output.

It is determined that a defect 603 detected using the filter 500 in FIG. 5 is a point-like defect, for example, and, in the UI screen 601, text 605 "point-like defect" is additionally displayed in the vicinity of the defect 603. In addition, it is determined that a defect 604 detected using the filter 510 in FIG. 5 is a linear defect, and, in the UI screen 601, text 606 "linear defect" is additionally displayed in the vicinity of the defect 604. Furthermore, the coordinates of the defects that are indicated by reference numerals 607 and 608 may also be displayed. Note that a display method of a test result is not limited to the above-described method, and, for example, the method is not limited as long as it is possible to identify which type of processing out of a plurality of types of detection processing was used for detecting a defect, for example, by performing emphasis display using a color that is different for each type of detection processing. Note that FIG. 6 shows an example of a case where one point-like defect and one linear defect are detected, but, as a matter of fact, a plurality of point-like defects and a plurality of linear defects may be detected, and all of the defects are displayed. Here, in order to simplify the description, a case is described in which one point-like defect and one linear defect are detected.

In addition, the UI screen 601 may be configured by including buttons 609 and 610 for setting parameters of respective types of defect detection processing. In the example in FIG. 6, when the button 609 is selected, it is possible to adjust a processing parameter for when defect detection processing for a point-like defect is executed. In addition, if the button 610 is selected, it is possible to adjust processing parameter for when defect detection processing for a linear defect is executed. A configuration may be adopted in which, when one of these adjustment buttons is selected, the display changes to a screen for adjusting the parameter, or a pop-up screen is displayed over the UI screen 601 such that the parameter is adjusted.

Furthermore, the processing parameters of the respective types of defect detection processing set in S301 may be displayed in the UI screen 601. When the parameters are displayed, it is desirable that the parameters of all the types of defect detection processing that have been used are displayed, and, for example, a parameter of a type of defect detection processing by which no defect has been detected may also be displayed. As a result of displaying parameters in this manner, the operator can further determine with ease which parameter to adjust and how to adjust the parameter. In addition, a configuration may also be adopted in which, when parameters of respective types of defect detection processing are displayed, adjustment bars or the like corresponding to the parameters are displayed in the UI screen 601, and the parameters can be adjusted by the sliding the bars. Alternatively, a region in which a numerical value of a parameter can be directly input may also be provided. When adjustment is completed, test processing may be executed again using an image already obtained in S303 and S304 as a result of an instruction of execution of test processing again being given using a button (not illustrated) or the like. In this case, a detection result obtained using newly set parameters is updated and is displayed in the UI screen 601. Note that a detection result may be automatically updated in accordance with an adjustment bar being slid if possible, depending on the processing capability of the image processing apparatus 100. Accordingly, optimum parameters can be easily confirmed, and optimum parameters can be set in test processing from the next time onward.

As described above, the image processing apparatus according to this embodiment obtains a reference image and a verification target image, and selects a plurality of types of defect detection processing from a plurality of types of defect detection processing for performing defect detection in the verification target image. In addition, this image processing apparatus executes the selected types of defect detection processing on a difference image between the reference image and the verification target image in accordance with the processing parameters of the selected types of defect detection processing. Furthermore, this image processing apparatus outputs a result display screen according to which a defect in the verification target image and a type of defect detection processing used for detecting the defect can be identified, when the defect is detected. Thus, according to this embodiment, when image defect detection is performed using a plurality of types of detection processing, output can be performed such that a type of detection processing used for detecting each image defect included in the detection result can be confirmed. Thus, in test processing of a printed article, even when a test is performed using a plurality of types of defect detection processing, the user can easily confirm which parameter (which type of processing) to change. Therefore, the parameter adjustment load of the test system can be decreased.

In addition, with this image processing apparatus, the processing parameters of types of defect detection processing that have been used are also displayed at the same time, and furthermore, a configuration may also be adopted in which the processing parameters can be adjusted via the result display screen. Accordingly, the user can adjust processing parameters of the types of defect detection processing while checking the image that includes detected defects, and thus the adjustment load can be further decreased. In addition, as a result of displaying a processing parameter of defect detection processing by which no defect has been detected, it is also possible to perform setting of a processing parameter of defect detection processing by which a defect can be accurately detected. Accordingly, it is possible to suppress overlooking of a defect site and the like.

Second Embodiment

A second embodiment will be described below. In the above first embodiment, a description has been given for a method for displaying types of defect detection processing and detected defects in association. In contrast, in this embodiment, a further description will be given, as a display method, for a method according to which a switch can be made between the method according to the first embodiment and a method for collectively displaying detected defects irrespective of types of defect detection processing. Note that, hereinafter, configurations and control similar to those in the above first embodiment are given the same reference numerals or operation numbers, and a description thereof is omitted. The configuration of the print system according to this embodiment is similar to the configuration described with reference to FIG. 1 in the above first embodiment, and thus a description thereof is omitted.

Function Configuration of Image Processing Apparatus

Figure 7:
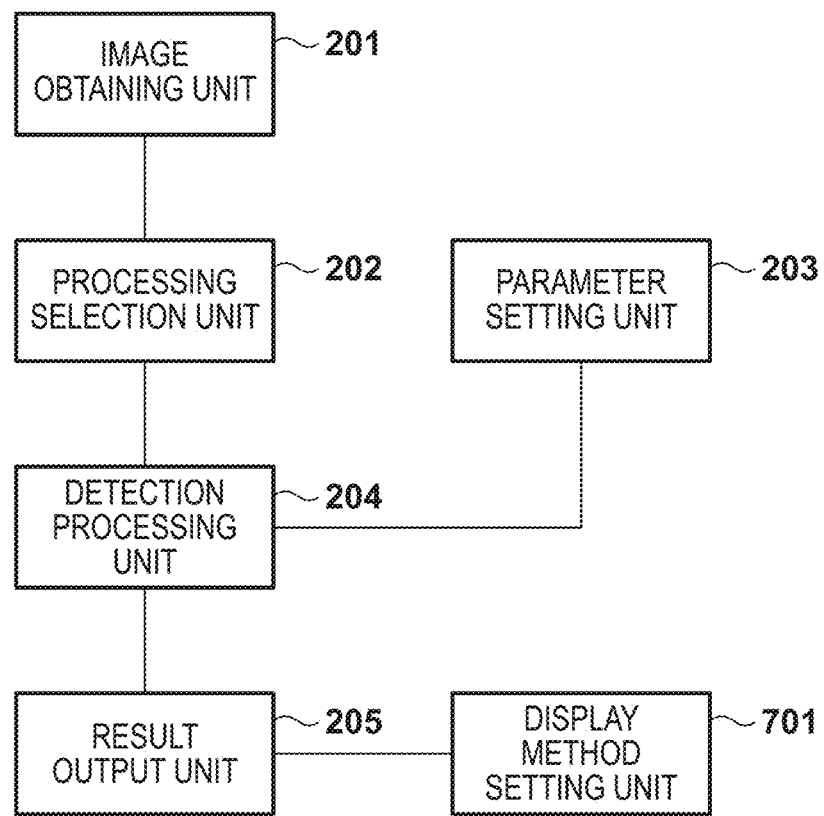
FIG. 7 is a block diagram showing a function configuration of an image processing apparatus according to an embodiment.

First, configurations of the functional blocks of the image processing apparatus 100 according to this embodiment are illustrated with reference to FIG. 7. Note that the image obtaining unit 201 to the result output unit 205 have similar configurations to those in the above first embodiment, and thus a description thereof is omitted.

The image processing apparatus 100 according to this embodiment includes a display method setting unit 701 in addition to the above configurations (201 to 205). The display method setting unit 701 sets a display method and makes a switch of display based on an operation obtained from the user via the UI panel 108 or the like. The display method according to this embodiment includes a parameter setting mode that has been described in the above first embodiment, and in which defect detection processing by which each defect was detected is displayed in an identifiable manner, and a test execution mode only for displaying detected defects. The test execution mode is not based on an assumption of parameter adjustment as in the parameter setting mode described in the above first embodiment, and thus information related to parameter adjustment is unnecessary. Therefore, only a detected defect site is displayed without such unnecessary information being displayed. Note that a configuration may be adopted in which, in each display screen, a change can be made to a display screen change in another mode.

Test Processing

Figure 8:
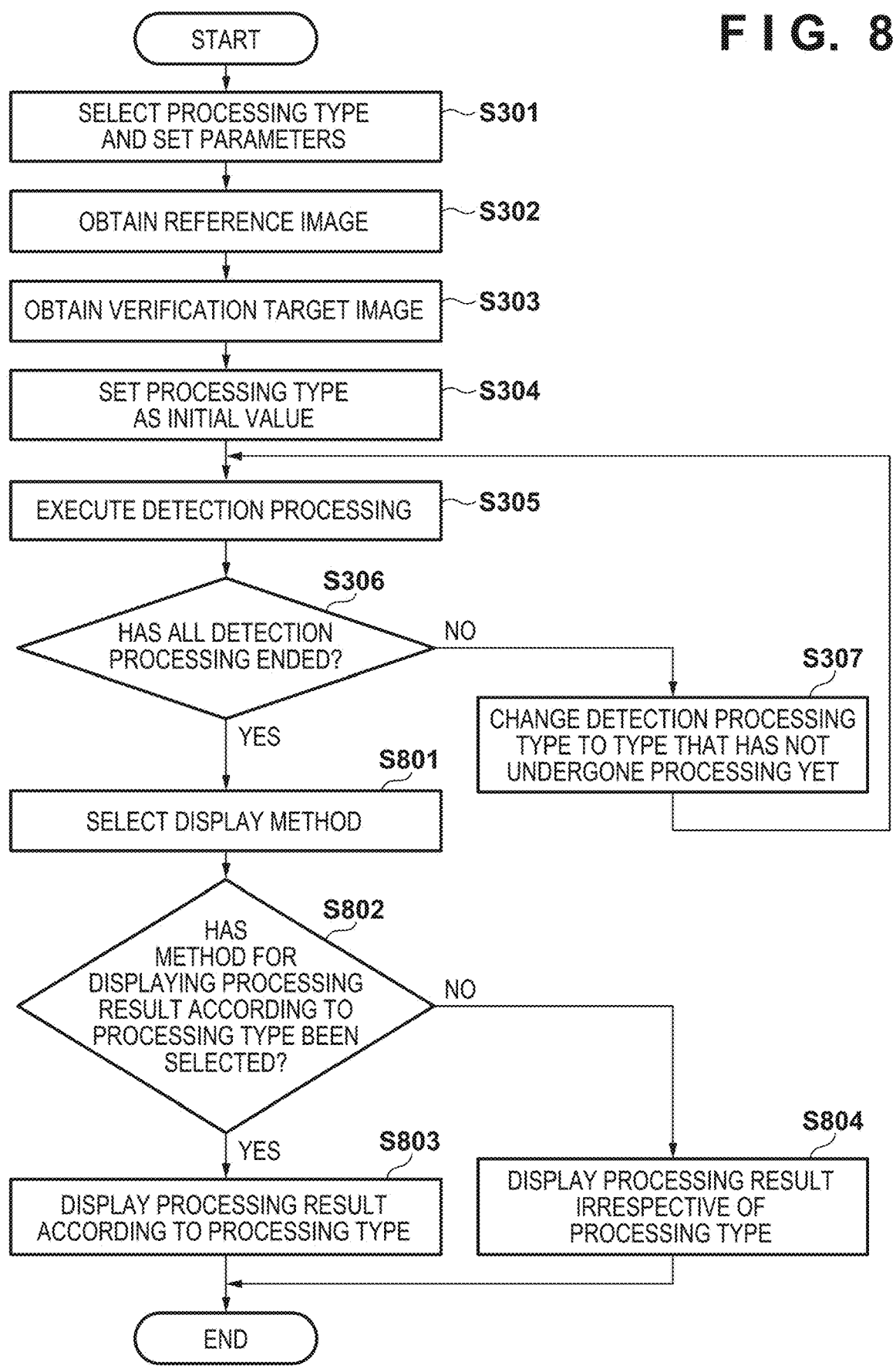
FIG. 8 is a flowchart showing a processing procedure of test processing that is performed by an image processing apparatus according to an embodiment.
Figure 9:
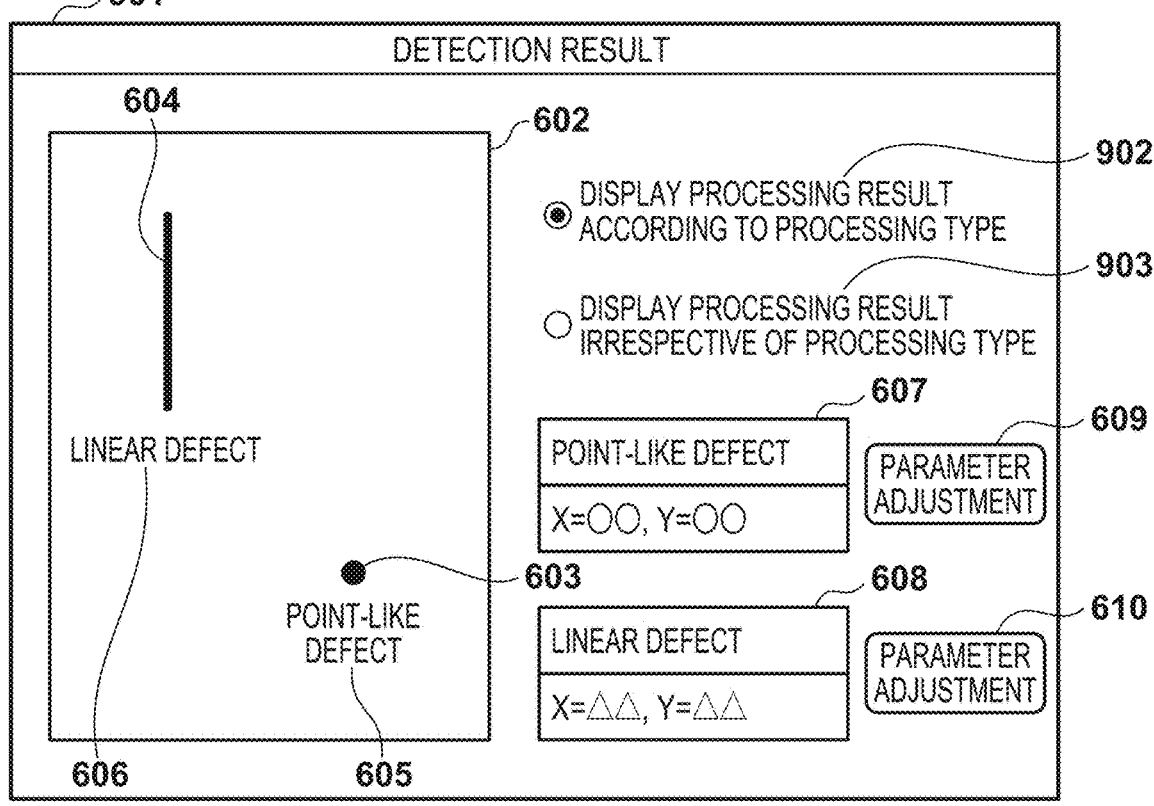
FIG. 9 is a diagram showing an example of a result display screen according to an embodiment.
Figure 10:
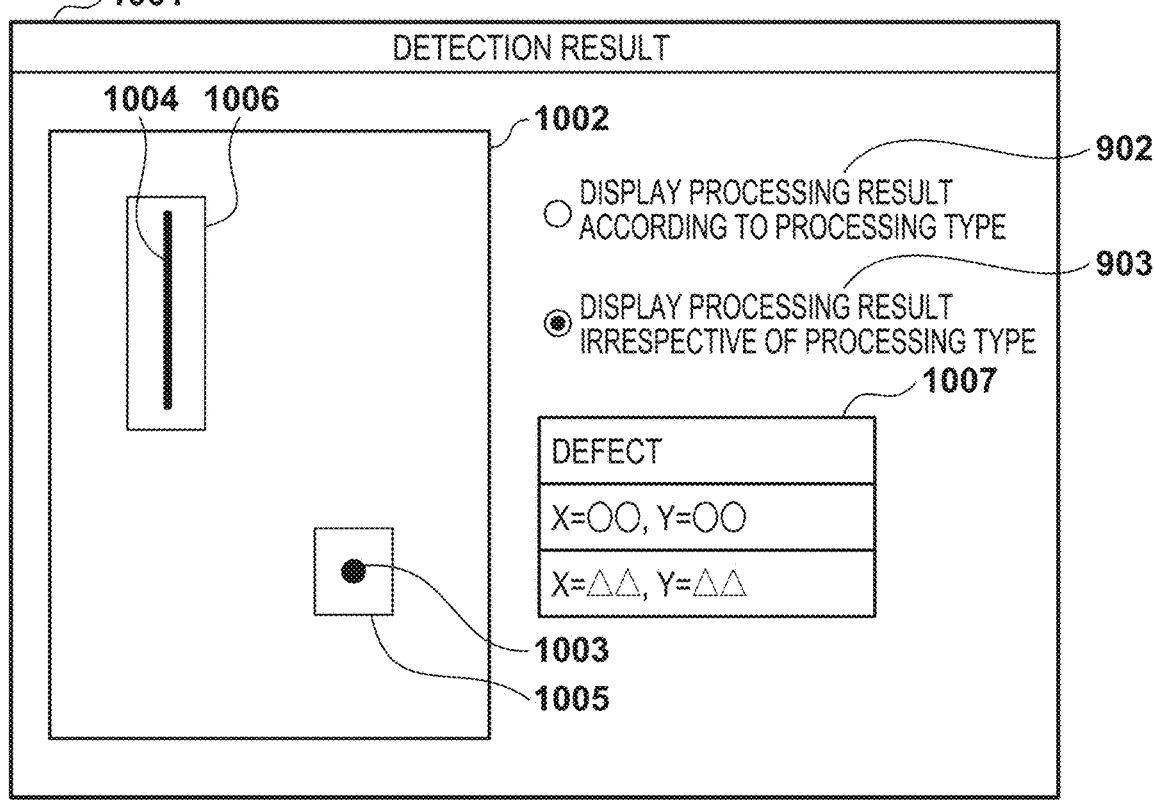
FIG. 10 is a diagram showing an example of a result display screen according to an embodiment.

Next, a processing procedure of test processing that is performed by the image processing apparatus 100 according to this embodiment will be described with reference to FIG. 8. Processing to be described below is realized by the CPU 101 reading out a program stored in the ROM 103 to the RAM 102, and executing the program, for example. Note that processes similar to those in FIG. 3 are given the same numbers, and a description thereof is omitted. In addition, FIGS. 9 and 10 show an example of a result display screen according to this embodiment.

If it is determined in S306 that all the types of defect detection processing have ended, the procedure advances to S801, and the display method setting unit 701 selects a display method. A display screen of default settings is first selected. Here, a display result screen of the parameter setting mode, for example, the display method shown in a UI screen 901 in FIG. 9 is selected as default settings. Note that, when one of radio buttons 902 and 903 included in UI screens 901 and 1001 is selected, the process in S801 onward is executed again, and a switch is made between the UI screen 901 and a UI screen 1001 accordingly.

When a display method is selected, the procedure advances to S802, and the display method setting unit 701 determines whether or not "method for displaying processing result according to processing type" of the radio button 902, in other words the parameter setting mode has been selected. Here, if the parameter setting mode is selected, the procedure advances to S803. On the other hand, if "method for displaying processing result irrespective of processing type" of the radio button 903, in other words the test execution mode is selected, the procedure advances to S804.

In S803, similarly to the above first embodiment, the display method setting unit 701 displays a processing result according to processing type using a method such as that shown in the UI screen 901, and ends the procedure. On the other hand, in S804, the display method setting unit 701 displays a processing result irrespective of processing type as shown in the UI screen 1001, and ends the procedure.

Display Method

Here, display screens of a detection result to be displayed in S803 and S804 will be described in detail with reference to FIGS. 9 and 10. The UI screen 901 in FIG. 9 is a screen for displaying a processing result according to type of defect detection processing, based on a display method that is equivalent to the UI example shown in FIG. 6 according to the above first embodiment. Display contents similar to those in FIG. 6 are given the same reference numerals, and a description thereof is omitted. The UI screen 901 in FIG. 9 is configured by including the radio buttons 902 and 903 that enable a switch between display methods, in addition to the contents indicated by 602 to 610. The radio button 902 is a radio button for switching to display of a result display screen of "method for displaying processing result irrespective processing type", in other words the parameter setting mode, and is displayed already in the UI screen 901 and thus is in a checked state. The radio button 903 is a radio button for switching to display of a result display screen of "method for displaying processing result irrespective of processing type", in other words the test execution mode, and, when the radio button 903 is selected, the display changes to the UI screen 1001.

In the UI screen 1001 in FIG. 10, similarly to the UI screen 901, a whole image 1002 of a verification target image is displayed. Here, a point-like defect 1003 and a linear defect 1004 are displayed and respectively surrounded by rectangles 1005 and 1006 without being distinguished from each other, irrespective of type of detection processing used for detection. In addition, the coordinates of the defects that are indicated by reference numeral 1007 are collectively displayed irrespective of type of detection processing. Furthermore, the UI screen 1001 is configured by including the radio buttons 902 and 903 similarly to the UI screen 901, and the radio button 903 is in a selected state. When the radio button 902 is selected, the display changes to the UI screen 901. Thus, the UI screen 1001 is a screen for displaying a processing result irrespective of type of defect detection processing.

As described above, when defect detection is performed, the image processing apparatus according to this embodiment can identify a defect in a verification target image, and can further output another result display screen in which defect detection processing used for detecting the defect cannot be identified. In addition, according to this embodiment, a switch of display can be made between the result display screen of the above first embodiment and the other result display screen. Accordingly, in test processing of a printed article, when a test that uses a plurality of types of defect detection processing is performed, the user can confirm which parameter (processing) to change during parameter adjustment or the like. In addition, when only a detection result simply needs to be confirmed, a more simple display can be performed, and a more user-friendly operation system can be provided.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2020-147086, which was filed on Sep. 1, 2020 and which is hereby incorporated by reference herein in its entirety.

What is claimed is:

1. An image processing apparatus comprising:
at least one memory device that stores a set of instructions; and
at least one processor that executes the set of instructions to:
obtain a reference image and a verification target image;
select one or more defect detection processing from a plurality of types of defect detection processing for performing defect detection in the verification target image;
execute the selected one or more defect detection processing on a difference image between the reference image and the verification target image in accordance with processing parameters of the selected one or more defect detection processing; and
output a result display screen in which a defect in the verification target image and a defect detection processing used for detecting the defect can be identified, in a case where the defect is detected.

2. The image processing apparatus according to claim 1, wherein the at least one processor executes instructions in the memory device to:
display, in the result display screen, a whole image of the verification target image and a character string indicating a defect detection processing that has been used, in the vicinity of the detected defect.

3. The image processing apparatus according to claim 1, wherein the at least one processor executes instructions in the memory device to:
display a whole image of a verification target image in the result display screen, and perform emphasis display of a detected defect using a color representing a defect detection processing that has been used.

4. The image processing apparatus according to claim 1, wherein the at least one processor executes instructions in the memory device to:
display a processing parameter for each defect detection processing that has been used, in the result display screen.

5. The image processing apparatus according to claim 4, wherein the at least one processor executes instructions in the memory device to:
display, in the result display screen, a processing parameter of a defect detection processing by which no defect has been detected.

6. The image processing apparatus according to claim 1, wherein
in the result display screen, a parameter can be adjusted for each defect detection processing that has been used.

7. The image processing apparatus according to claim 1, wherein the at least one processor executes instructions in the memory device to:
further output another result display screen in which a defect in the verification target image can be identified and a defect detection processing used for detecting the defect cannot be identified, in a case where the defect is detected, and
wherein it is possible to make a switch of display between the result display screen and the other result display screen.

8. The image processing apparatus according to claim 1, wherein
the plurality of types of defect detection processing include at least processing for detecting a point-like image defect and processing for detecting a linear image defect.

9. The image processing apparatus according to claim 1, further comprising:
a reading unit that reads a printed article conveyed from a print apparatus via a conveyance path,
wherein the at least one processor executes instructions in the memory device to:
obtain data as the reference image from a memory, the data having been obtained by the reading unit reading a printed article that does not include any defect in advance, and
cause the reading unit to read a printed article that is a verification target conveyed from the print apparatus, and obtain the read data as the verification target image.

10. The image processing apparatus according to claim 1, wherein the at least one processor executes instructions in the memory device to:
further set a processing parameter of a selected defect detection processing in accordance with user input.

11. The image processing apparatus according to claim 1, wherein the at least one processor executes instructions in the memory device to:
output screen information of the result display screen to an external apparatus communicably connected to the image processing apparatus via a network to cause the external apparatus to display the screen information.

12. A control method of an image processing apparatus, comprising:
obtaining a reference image and a verification target image;
selecting a plurality of types of defect detection processing from a plurality of types of defect detection processing for performing defect detection in the verification target image;
executing the selected types of defect detection processing on a difference image between the reference image and the verification target image in accordance with processing parameters of the selected types of defect detection processing; and
outputting a result display screen in which a defect in the verification target image and a defect detection processing used for detecting the defect can be identified, in a case where the defect is detected.

13. A non-transitory computer-readable storage medium storing a computer program for causing a computer to execute a control method of an image processing apparatus, the control method comprising:
obtaining a reference image and a verification target image;
selecting a plurality of types of defect detection processing from a plurality of types of defect detection processing for performing defect detection in the verification target image;
executing the selected types of defect detection processing on a difference image between the reference image and the verification target image in accordance with processing parameters of the selected types of defect detection processing; and
outputting a result display screen in which a defect in the verification target image and a defect detection processing used for detecting the defect can be identified, in a case where the defect is detected.

* * * * *